3,158,570
FLOTATION OF METALLIC SOAP
James B. Duke, Metuchen, N.J., assignor to Minerals &
 Chemicals Philipp Corporation, Menlo Park, N.J., a
 corporation of Maryland
No Drawing. Filed June 5, 1963, Ser. No. 285,599
19 Claims. (Cl. 210—44)

This invention relates to the separation of trace quantities of metallic soap particles from aqueous systems in which the particles are suspended.

Large volumes of aqueous liquids containing trace quantities of suspended micron size metallic soap particles are encountered as waste effluents in industrial processes. For example, in the production of foamed synthetic rubber goods, zinc soaps that are used in the polymerization step and/or the foaming step, are removed from the foamed article in a washing step. The soap values in these effluents represent an economic loss unless they can be recovered. Especially in the case of heavy metal soaps, care must be taken to avoid dumping of the effluents into streams when the concentration of heavy metal soap is at a level toxic to fish. Since the metallic soap particles are finely divided they cannot be removed by filtration at acceptable flow rates. Prior art efforts to remove the soap particles by conventional froth flotation have been unsuccessful.

Accordingly, an object of this invention is the provision of a method for recovering metallic soap values in aqueous effluents containing small amounts of the metallic soap in the form of suspended particles.

Another object is the provision of a method for reducing the concentration of heavy metal soap in waste effluents so that the clarified effluents can be safely disposed of in streams.

A specific object of the invention is a method for processing waste effluents from foam rubber plants so as to reduce the $Zn^{++}$ content of the effluents to values such that the effluents are no longer toxic to fish when disposed in streams.

Another object is to accomplish the aforementioned object simultaneously while recovering the zinc soap in the effluent so that the soap can be reused.

Still another object is to accomplish all of the aforementioned objects by a simple froth flotation procedure.

In accordance with this invention, trace amounts of metallic soap particles are separated substantially quantitatively from water in which they are dispersed by incorporating the following materials into the dilute aqueous dispersion of soap particles with agitation: (1) a cation-active nitrogenous compound which has a long-chain hydrocarbon group and (2) finely-divided solid particles which, when agitated in said aqueous dispersion with said cation-active nitrogenous compound, are surface coated (oiled) thereby and are capable, upon aeration of said aqueous dispersion, of floating as a froth on the surface of the aqueous phase. The resultant aqueous pulp is then subjected to froth flotation by introducing air bubbles into the pulp, producing a froth which is a concentrate of metal soap particles originally suspended in the water in intimate association with oiled particles of finely-divided solid that were incorporated into the effluent water in order to promote the flotation of the soap particles, leaving water of substantially reduced soap content as a residue.

The flotation of metal soap particles from the aqueous phase of the effluent is improved to a noteworthy extent in most instances when the solids of the effluent are flocculated before undergoing flotation in accordance with the general flotation process of the invention. Thus, an acidic flocculating agent is preferably incorporated into the aqueous effluent before the effluent is subjected to flotation.

In accordance with one form of the invention, water-insoluble, micron size particles of an inorganic solid, especially micron size particles of a mineral solid such as quartz flour, are employed as the additive solid particles that report in the froth product in intimate association with soap particles when the reagentized effluent is aerated.

In accordance with still another form of the invention, the additive solid material is composed of solid particles that are formed in situ in the aqueous effluent containing suspended metallic soap particles by incorporating a water-soluble permanganate salt and a flocculating agent into the pulp, thereby forming a precipitate by reaction with normally soluble compounds in the effluent. This precipitate, when oiled with a cation-active nitrogenous compound, reports in the froth and functions as a flotation reagent. This form of the invention is especially applicable to the treatment of effluents from latex washing plants which do not respond to a satisfactory extent to flotation with mineral solid as a flotation reagent.

This invention contemplates also the separation of the metallic soap from the remainder of the froth product so that the soap can be reused.

The invention will be better understood by the following description thereof.

The subject invention is especially directed to the processing of effluents containing less than about 500 p.p.m. of metallic soap, expressed on the basis of the metallic ion content of the soap in the effluent. Typical effluents contain from about 10 to about 100 p.p.m. of soap, expressed as metallic ion of the soap. The soap particles range in size from a fraction of a micron upward and typically have an average diameter of 5 to 20 microns as determined by graded filter paper tests.

The metallic soaps to which the process is applicable are substantially insoluble metallic salts of monobasic carboxylic acids. The soaps have the formula $$(RCOO)_xM,$$

wherein M is a polyvalent metal radical of valence state $x$ and is selected from the group consisting of an alkaline earth metal radical and a heavy metal radical, and R is an organic radical containing at least 6 carbon atoms and usually 12 to 18 carbon atoms. Thus, metallic soaps encompass the calcium, magnesium, strontium, cesium, barium, zinc, lead, manganese and copper salts of acids such as lauric acid, stearic acid, oleic acid, ricinoleic acid, linoleic acid, naphthenic acids, rosin acids, linseed oil fatty acids, 2-ethyheoxic acid, tall oil fatty acid and mixtures of the aforementioned. While these effluents are susally obtained as washings in chemical processes, the flotation treatment of this invention is applicable also to the processing of dilute aqueous suspensions of metallic soap of any origin, including soaps formed in situ.

As metioned hereinabove, in carrying out one form of the invention, a water-insoluble solid that is floatable when reagentized with a cationic nitrogenous flotation collector reagent is incorporated into the effluent. The solid additive material is in the form of minus 200 mesh (Tyler) particles and contains particles principally within the range of 1 to 44 microns. Preferably, the additive particles have low absorption values, less than 10 pounds of alkali-refined linseed oil per 100 pounds of solid as determined by the well-known Gardner-Coleman method. For this reason naturally occuring minerals are in most instances preferable to their synthetic counterparts obtained by precipitation processes. Among suitable water-insoluble additives may be mentioned calcite, quartz, barytes and fluorspar. When a constituent of the floated metallic soap is to be recovered from the froth product of the flotation treatment by acidification of the froth product to effect the decomposition of the soap and the formation of a soluble metallic salt which can be washed from the solid additive particles and recovered, it will obviously be desirable to employ as the additive particles a material, such as quartz, which will not be decomposed when it is acidified with mineral acid. The quantity of finely-divided solid additive particles incorporated into the effluent as a flotation reagent does not appear to be very critical. Typically, addition of finely-divided solid particles in amount within the range of from about ½% to 5% of the weight of effluent will suffice.

After incorporation of finely-divided solid flotation agent, either by a separate addition of a preformed solid such as silica flour, or by the in situ formation of a precipitate in the effluent by permanganate addition, as described in detail hereinafter, the effluent should be agitated to maintain the solids in suspension.

As mentioned, flocculating agent is preferably incorporated into the effluent before it is subjected to froth flotation. Aluminum sulfate (including hydrates of aluminum sulfate) is preferred as the flocculating agent although other soluble polyvalent sulfates such as ferrous sulfate or ferric sulfate, ammoniated alum, ferric ammonium sulfate and ferrous ammonium sulfate can be used. Preliminary experiments indicate that optimum metallic soap flotation is realized when flocculating agent is incorporated in amount sufficient to produce a pulp that has a pH within the range of 6 to 7 before addition of cationic collector reagent. A typical quantity of flocculating agent is within the range of about 0.1 to 0.5 pound per ton of effluent. The flocculating agent can be incorporated into the effluent at any time prior to froth flotation. Excellent results have been obtained by adding the flocculating agent before addition of cationic collector reagent but after incorporation of finely-divided solids into the effluent. The effluent should be agitated after addition of flocculating agent to prevent formation of large coagulated flocs which are not as amenable to froth flotation as smaller flocs.

In carrying out the form of the invention in which a precipitate is produced in situ by addition of permanganate ion to an effluent containing dispersed, nonfilterable soap particles, the use of potassium permanganate is recommended for economic reasons. However, other water-soluble sources of permanganate, such as calcium permanganate or sodium permanganate, can be used. Only small quantities of permanganate ion are required and the use of excessive permanganate ion is to be avoided for economic reasons.

Cationic nitrogenous flotation reagents which may be used in carrying out this invention include higher aliphatic amines and their salts with water-soluble acids, esters of alkanolamines with higher fatty acids and their salts with water-soluble acids and higher aliphatic quaternary ammonium bases and their salts with water-soluble acids. Preferred are acetate and chloride salts of N-aliphatic primary amine having from 12 to 20 carbon atoms, especially 16 to 18 carbon atoms, in the aliphatic chain. Suitable primary fatty amines are available commercially in distilled, undistilled or still bottom grades and are obtained, by way of example, from tall oil fatty acids, caprylic acid, capric acid, lauric acid, myristic acid, palmitic acid, stearic acid and mixed acids from soybean oil, coconut oil, tallow and hydrogenated tallow. The fatty acid or mixture of fatty acids is converted into a nitrile by reaction with ammonia and the nitrile is subjected to catalytic hydrogenation at about 150° C. to produce a material consisting of about 85% primary amine, with the balance secondary amine and minor quantities of tertiary amine. Since the preferred fatty amines have low solubility, it is desirable to use the fatty amine in the form of a salt of a water-soluble organic or inorganic acid, preferably acetic acid.

The quantity of cationic flotation reagent employed in the process will vary somewhat with the quantity and nature of the solid additive particles incorporated into the effluent and is typically within the range of 0.1 to 1.0 pound per ton of effluent.

In putting the invention into practice, after each addition of flotation reagent, the effluent is agitated without aeration (conditioned) for a short period of time, such as from 15 to 30 seconds. Especially when a flocculating agent is used, conditioning time should be limited so as to prevent appreciable coagulation of flocs, thereby impairing flotation.

After conditioning of the effluent is completed, air is bubbled into the reagentized metallic soap effluent, causing reagentized solids in the effluent to float on the surface of the liquid as a froth. This froth is removed from the liquid as it is formed. The concentration step can be carried out without addition of make-up water. The froth product of the flotation step is a concentrate of metal soap particles (originally present in the effluent in a non-filterable, dispersed condition) in intimate association with additive solids. The soap can be separated from the additive and reused, if desired, or the froth product can be discarded. The underflow (machine discharge product) of the flotation process can be dumped into any suitable body of water without further treatment since the residue of the flotation operation is substantially free from metallic soap.

Any agitated vessel can be used to mix the flotation reagents uniformly into the effluent. This step, as well as the aeration and flotation, can be carried out in conventional flotation equipment, such as is used in flotation of mineral ores.

In some instances, an initial scum can be floated from the metal soap wash water without addition of reagents by aerating the water in a suitable flotation cell and removing soap solids as a scum. The residue of this flotation operation is then conditioned, as described above, and then aerated and floated.

For a clearer understanding of this invention, the flotation of trace quantities of zinc soap in washer effluents from a synthetic foam rubber plant will be described. It will be distinctly understood, however, that the process is not limited to the flotation of zinc soaps since the process also finds application in the flotation of other insoluble or poorly soluble soaps.

The latex washer effluents employed in each of the flotation tests described hereinafter contained an approximately 50/50 mixture of zinc oleate (used in the original polymerization) and zinc ricinoleate (used in compounding). The soap particles in the effluents were in the form of particles about 10 microns in diameter (as determined by tests with graded filter paper) and were present in trace quantities which exceeded substantially 0.3 p.p.m. $Zn^{++}$, which is about the maximum $Zn^{++}$ content tolerable to fish life. In the examples, all reagent quantities are reported on the basis of pounds per ton of effluent or as a percentage of the weight of the effluent.

EXAMPLE I

Test No. 1.—This example illustrates the clarification of a zinc soap washer effluent containing 95 p.p.m. $Zn^{++}$ with permanganate ion addition and amine salt collector reagent. The sample as received was a pink opaque color and had a pH of 9.25.

470 ml. of the zinc wash water effluent was put into a 100 gm. Minerals Separation Sub A flotation machine. 20 ml. of a 1% aqueous solution of $KMnO_4$ was added (0.8 lb./ton) and agitated for ½ minute, producing a copious brown precipitate. 10 ml. of a 5% aqueous solution of alum (2.0 lbs./ton) was added with agitation to floc the precipitate. 8 ml. of a 2.5% aqueous solution of an acetate salt of the 18 carbon atom amine derived from tallow fatty acids (Armac T) was added in amount of 0.8 lb./ton. The charge in the flotation cell was agitated for 15 seconds with the air off. Air was admitted and the charge was frothed for 5 minutes. The machine discharge product from the flotation cell was very clear and colorless, indicating that substantially all of the zinc soap particles had been removed along with material precipitated by the permanganate.

*Summarized Results*

| Test No. | Reagents | Machine Discharge Clarified Water | | |
|---|---|---|---|---|
| | | Percent Yield | $Zn^{++}$, p.p.m. | $Zn^{++}$ Distribution, Wt. Percent |
| 1 | $KMnO_4$, Alum, Armac T | 74.5 | 0.8 | 0.6 |

These results show that the $Zn^{++}$ content of the washings was reduced from 95 p.p.m. to only 0.8 p.p.m. by precipitating solids in the washing by permanganate addition and further reagentizing the washings with alum flocculant and cationic amine.

EXAMPLE II

This example illustrates the flotation of various zinc soap washing effluents with mineral additive and amine reagent and demonstrates the desirability of employing a flocculating agent in the process.

A. *Tests on the Effluent of Example I (95 p.p.m. $Zn^{++}$)*

SILICA FLOUR AS SOLID REAGENT

*Test No. 2.*—470 ml. of the zinc wash water was put into the 100 gm. Minerals Separation Sub A flotation machine. 4.7 gms. of silica flour (—325 mesh quartz) was added and agitated for ½ minute. 8 ml. of a 2.5% aqueous solution of Armac T (0.8 lb./ton) was added and conditioned for 15 seconds. The pulp was aerated and frothed for 5 minutes. The machine discharge was very murky, indicating inefficient removal of soap.

*Test No. 3.*—Test No. 3 was repeated with the exception that 10 ml. of 5% alum (2.0 lbs./ton) was added to bring the effluent to a pH of 7.0 before addition of the silica flour. The machine discharge was clear and the float was very foamy.

Results of Tests No. 2 and No. 3 are summarized below:

| Test No. | Reagents | Machine Discharge Clarified Water | | |
|---|---|---|---|---|
| | | Percent Yield | $Zn^{++}$, p.p.m. | $Zn^{++}$ Distribution |
| 2 | 1% Silica Flour, 0.8 lbs./ton Armac T | 62.8 | 37.1 | 24.5 |
| 3 | Alum to pH of 7, 1% Silica Flour, 0.8 lbs./ton Armac T | 30.9 | 3.5 | 1.2 |

A comparison of the results of Test No. 2 and Test No. 3 shows that while more than three-quarters of the zinc soap was removed by the flotation with silica flour and Armac T without flocculating agent, 98.8% removal was effected when flocculating agent was used together with the silica flour and Armac T.

B. *Tests on an Aged Effluent Containing 20.0 p.p.m. $Zn^{++}$*

$CaCO_3$ AS SOLID REAGENT

*Test No. 4.*—The procedure of test No. 3 was repeated using 1% —325 mesh (Tyler) calcite (based on the weight of the effluent) in place of silica flour and reducing the quantity of Armac T reagent to 0.4 lb./ton to account for the lower $Zn^{++}$ content of the effluent. The calcite employed in the test had been hydraulically classified to a mean particle size of 2.5 microns (as determined by a sedimentation procedure).

*Tests Nos. 5–7.*—Test No. 4 was repeated with the exception that the pH of the effluent was conditioned with alum to pH values of 6 to 8 prior to addition of calcium carbonate mineral and Armac T collector reagents.

Summarized results of these flotation tests are given below:

| Test No. | Reagents | Machine Discharge Products, $Zn^{++}$, p.p.m. |
|---|---|---|
| 4 | 1% $CaCO_3$, 0.4 lbs./ton Armac T | 13.5 |
| | Same as Test No. 4 except alum added to: | |
| 5 | pH of 8.0 | 8.0 |
| 6 | pH of 7.0 | 0.5 |
| 7 | pH of 6.0 | 1.5 |

Results of Tests Nos. 4 to 7 show that zinc soap flotation with calcium carbonate and Armac T reagents was improved when the effluent was flocculated to pH values of 6 to 7 before flotation.

EXAMPLE III

Also in accordance with this invention, a zinc soap effluent at a pH of 7.95 and containing 15.7 p.p.m. $Zn^{++}$ was aerated for 2 minutes in a flotation cell to remove floatable agglomerates present in the sample as received. The machine discharge product analyzed 5.0 p.p.m. $Zn^{++}$. This machine discharge product was conditioned with the following reagents in the order given:

| | Quantity |
|---|---|
| Ferric sulfate | 0.17 lb./ton. |
| Calcite (—325 mesh) | 1% based on weight of first machine discharge. |
| Armac T | 0.40 lb./ton. |

The reagentized effluent was subjected to froth flotation and a froth product was withdrawn for 5 minutes. No make-up water was used. The machine discharge product of this second flotation treatment analyzed 0.3 p.p.m. $Zn^{++}$.

It will be appreciated by those skilled in the art that modifications in the reagents and reagent quantities in the foregoing examples may be made without departing from the spirit and scope of this invention.

I claim:
1. A method for clarifying a dilute aqueous dispersion of particles of metallic soap which comprises:
   incorporating finely-divided water-insoluble particles into said dispersion, said water-insoluble particles being capable of floating in said dispersion when a cationic nitrogenous flotation reagent is incorporated therein,
   while agitating said dispersion containing water-insoluble particles so as to maintain solids in said dispersion in suspension, incorporating therein a cationic nitrogenous flotation reagent,
   and subjecting said dispersion thus treated to froth flotation, thereby producing a froth product which is a concentrate of particles of metallic soap originally in said dispersion in intimate association with said finely-divided water-insoluble particles that were incorporated into said dispersion and a machine discharge product which is an aqueous liquid of substantially reduced metallic soap content as compared with the metallic soap content of the original dilute aqueous dispersion.
2. The method of claim 1 including the step of incorporating a flocculating agent into said dispersion before subjecting said dispersion to froth flotation.

3. The method of claim 1 wherein said cationic flotation reagent is a salt of a N-aliphatic hydrophobic amine and a water-soluble acid.

4. The method of claim 1 wherein the concentration of metallic soap originally in said aqueous dispersion is less than 100 p.p.m., expressed as the concentration of metallic ion of said soap.

5. A method for clarifying a dilute aqueous dispersion of particles of metallic soap which comprises:
incorporating into said dispersion
(1) micron size particles of water-insoluble material,
said particles being further characterized by the fact that they are capable of floating in said pulp when they are surface coated with a cationic nitrogenous flotation reagent, and
(2) a cationic nitrogenous flotation reagent, and subjecting said dispersion thus treated to froth flotation,
thereby producing a froth product which is a concentrate of soap particles originally dispersed in said aqueous liquid in intimate association with said particles of water-insoluble material and a machine discharge product which is an aqueous liquid substantially free from soap particles originally dispersed therein.

6. The method of claim 5 including the step of adding a flocculating agent into said dispersion before subjecting said dispersion to froth flotation.

7. The method of claim 5 wherein said cationic flotation reagent is a salt of a N-aliphatic hydrophobic amine and a water-soluble acid.

8. The method of claim 5 wherein the concentration of metallic soap originally in said aqueous dispersion is less than 100 p.p.m., expressed as the concentration of metallic ion of said soap.

9. A method for clarifying a dilute aqueous dispersion of a polyvalent soap material which comprises:
incorporating a sufficient quantity of a water-soluble permanganate salt into water containing a small quantity of dispersed micron sized particles of polyvalent soap material to cause a precipitate to form,
incorporating a flocculating agent containing sulfate ion into said water,
while agitating said water containing flocculated precipitate, incorporating a cationic nitrogenous flotation reagent therein and subjecting the resulting aqueous system to froth flotation, thereby forming a froth product which is a concentrate of particles of polyvalent soap originally dispersed in said water in intimate association with particles precipitated by said permanganate salt and a machine discharge product which is an aqueous liquid substantially free from metallic soap.

10. The method of claim 9 wherein said cationic flotation reagent is a salt of a N-aliphatic hydrophobic amine and a water-soluble acid.

11. The method of claim 9 wherein the concentration of metallic soap originally in said water is less than 100 p.p.m., expressed as the concentration of metallic ion of said soap.

12. A method for recovering soap values in a dilute aqueous dispersion of particles of metallic soap which cannot be separated from an aqueous phase of said dispersion by filtration which comprises:
incorporating finely-divided quartz particles into said dispersion in amount of from about 1% to 5% of the weight of said dispersion,
while agitating said dispersion containing quartz particles so as to maintain solids in said dispersion in suspension, incorporating therein a cationic nitrogenous flotation reagent,
and subjecting said dispersion thus treated to froth flotation, thereby producing a froth product which is a concentrate of soap particles originally dispersed in said water in intimate association with said finely divided quartz particles and a machine discharge product which is an aqueous liquid substantially free from metallic soap particles.

13. A method for processing an aqueous waste effluent from a foam rubber plant and containing trace quantities of zinc soap so as to reduce the $Zn^{++}$ content of said effluent which comprises:
incorporating a small quantity of potassium permanganate into said effluent, thereby forming a precipitate,
incorporating a flocculating agent containing sulfate ion into said effluent, thereafter incorporating into said effluent with agitation a small quantity of acetate salt of a hydrophobic N-aliphatic amine,
and subjecting the effluent thus treated to froth flotation, thereby producing a froth product which is a concentrate of zinc soap particles originally in said effluent and a tailings which is an effluent of significantly reduced zinc soap content.

14. The method of claim 13 in which hydrophobic N-aliphatic amine is octadecylamine.

15. A method for processing an alkaline aqueous waste effluent containing trace quantities of zinc soap particles so as to reduce the $Zn^{++}$ content of said effluent which comprises:
incorporating into said effluent (1) a small quantity, as compared with the volume of said effluent, of micron sized particles of a mineral which is capable of floating in said effluent upon incorporation therein of a cationic nitrogenous flotation reagent, (2) a flocculating agent containing sulfate ion, and (3) a cationic nitrogenous flotation reagent,
and subjecting said effluent to froth flotation, thereby producing a froth product which is a concentrate of zinc soap particles originally in said effluent in intimate admixture with said particles of mineral and a machine discharge product which is an aqueous liquid substantially free from zinc soap particles.

16. The method of claim 15 wherein said cationic nitrogenous flotation reagent is octadecylamine acetate.

17. The method of claim 15 wherein said flocculating agent is aluminum sulfate and it is employed in amount sufficient to reduce the pH of the effluent to a value within the limits of 6 to 7.

18. The method of claim 15 wherein said mineral is substantially insoluble in acid.

19. The method of claim 15 wherein said mineral is quartz.

References Cited in the file of this patent

UNITED STATES PATENTS

| | | |
|---|---|---|
| 1,982,129 | Wells et al. | Nov. 27, 1934 |
| 2,410,633 | Counselman | Nov. 5, 1946 |

OTHER REFERENCES

Hansen et al.: Sewage Treatment by Flotation, Sewage Works J., vol. 15, March 1943, pp. 242–252.

Gehm.: Chemical Treatment of Soapy Waste Waters, Water Works and Sewerage, August 1945, pp. 255–257.